Patent Number: 4,481,619 … Date of Patent: Nov. 6, 1984

United States Patent
Oozeki

[54] TURNTABLE APPARATUS

[75] Inventor: Mikio Oozeki, Saitama, Japan

[73] Assignee: Tokyo Shibaura Denki Kabushiki Kaisha, Japan

[21] Appl. No.: 347,333

[22] Filed: Feb. 9, 1982

[30] Foreign Application Priority Data

Feb. 13, 1981 [JP] Japan ................ 56-19936

[51] Int. Cl.³ ............................................. G11B 17/04
[52] U.S. Cl. ................................ 369/270; 369/264
[58] Field of Search ............... 369/264, 270, 271, 258, 369/263, 77, 77.2

[56] References Cited

U.S. PATENT DOCUMENTS 4,305,142  12/1981  Hughes et al. ..................... 369/77.2
4,326,284  4/1982  Elliott ............................... 369/77.2

FOREIGN PATENT DOCUMENTS 709765  7/1966  Italy ..................................... 369/77
1216845  12/1970  United Kingdom .
1441080  6/1976  United Kingdom .

*Primary Examiner*—Steven L. Stephan
*Attorney, Agent, or Firm*—Cushman, Darby & Cushman

[57]  ABSTRACT

A turntable apparatus bears and rotates a disc inserted into a reproducing apparatus for signals recorded on the disc through a casing inlet opening. The turntable apparatus comprises a turntable rotatably supported on a chassis to move vertically and a center spindle rotatably supported coaxially with an axis of rotation of the turntable and received in a recess at the center portion of the turntable to move vertically. When the turntable is in its nonreproducing position, it is located below the casing inlet opening, and the center spindle is wholly contained in the recess. When the turntable is in its reproducing position, it is located above the casing inlet opening to bear the disc thereon, and the center spindle projects above the top surface of the turntable.

9 Claims, 7 Drawing Figures

TURNTABLE APPARATUS

BACKGROUND OF THE INVENTION

This invention relates to a turntable apparatus having a vertically movable turntable, more specifically to a turntable apparatus well adapted to a reproducing apparatus for signals recorded on a disc.

Generally, in a reproducing apparatus for signals recorded on a disc, a video disc, for example, is set on a turntable, and a reproducing stylus is brought into contact with the video disc to reproduce information recorded on the disc. The information is composed of video and audio signals, and is recorded with very high density according to PCM (pulse code modulation) recording system. Therefore, if any foreign matters, such as dust, dirt from the hands, etc., stick to the video disc, reproduction cannot be performed with success, involving noise in reproduced pictures. Accordingly, there have been developed various kinds of apparatus which are provided with means for enabling us to set on and remove the video disc from the turntable without directly touching the disc.

Hereupon, the video disc is contained in a casing opening on one side, enclosed with a holder which is locked to the casing. In this state, the video disc is inserted into the reproducing apparatus from one side thereof on which a casing inlet opening is provided. When the insertion is completed, the video disc with the holder is held in the reproducing apparatus, and the holder is unlocked and disengaged from the casing. When the casing is removed from the apparatus, the video disc and the holder slip out from one side of the casing to remain in the reproducing apparatus, thus making the casing empty. In this state, reproducing operation is started. When the empty casing is inserted into the reproducing apparatus from the one side thereof after the reproducing operation is completed, the video disc with the holder is put into the casing from the one side thereof, and the holder is locked to the casing. Then, when the casing is removed from the reproducing apparatus, both the video disc and the holder are taken out from the reproducing apparatus as they are held together in the casing.

In order to accomplish the aforesaid operation, the turntable to bear the video disc can move vertically so that it may be located below the plane along which the video disc is inserted in the nonreproducing mode, that is, below the casing inlet opening provided on the apparatus and that it may be moved up to carry only the video disc thereon in the reproducing mode. A turntable apparatus with such a turntable is generally constructed as shown in FIGS. 1 and 2. A chassis 10 is fitted with a bearing 12 penetrating the same. The bearing 12 supports a turntable shaft 14 so that the shaft 14 may move vertically and rotatably about an axis thereof. A turntable 16 is coaxially fixed on the upper portion of the turntable shaft 14. A center spindle 18 is coaxially coupled to the top end of the turntable shaft 14. As shown in FIG. 2, the center spindle 18 is intended to align the center of a video disc 20 placed on the turntable 16 with the axis of rotation of the turntable 16, so that the top surface of the center spindle 18 is located above the top surface of the turntable 16.

Therefore, a casing 21 containing the video disc 20 need be passed over the center spindle 18 which is located above the turntable 16. Namely, in the prior art turntable apparatus, the stroke of the vertical movement of the turntable 16 cannot help being considerable. Accordingly, the motor for moving the turntable 16 is subjected to heavy load, and the reproducing apparatus cannot be improved in compactness.

SUMMARY OF THE INVENTION

This invention is contrived in consideration of these circumstances, and is intended to provide a turntable apparatus reduced in the movement stroke of the turntable to relieve the load applied to the motor for driving the turntable, and to ensure compact design of a reproducing apparatus in which the turntable apparatus is incorporated.

According to an aspect of the present invention, there is provided a turntable apparatus which bears and rotates a disc inserted into a reproducing apparatus for signals recorded on the disc through a disc inlet opening formed in the reproducing apparatus, comprising a chassis, a turntable having a disc mounting surface and a recess at the central portion thereof, and rotatably supported on the chassis to move vertically between a first position where the disc mounting surface is located below the disc inlet opening and a second position where the disc mounting surface is located above the disc inlet opening to bear the disc thereon, a center spindle having a surface for regulating a disc mounting position, supported coaxially with an axis of rotation of the turntable, and received in the recess to move vertically between a third position where the surface for regulating the disc mounting position is located below the disc mounting surface and a fourth position where the surface for regulating the disc mounting position is located above the disc mounting surface to regulate the disc mounting position, and a moving mechanism for moving the center spindle from the third position to the fourth position as the turntable moves from the first position to the second position, and moving the center spindle from the fourth position to the third position as the turntable moves from the second position to the first position.

DETAILED DESCRIPTION OF THE PREFERRED EMBODIMENT

Figure 1:
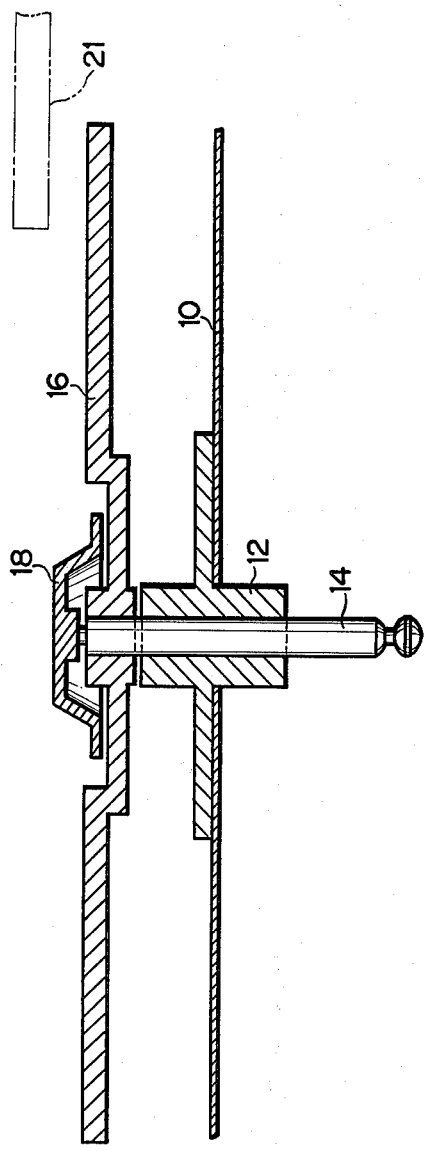
FIG. 1 is a sectional view showing a prior art turntable apparatus in the nonreproducing mode.
Figure 2:
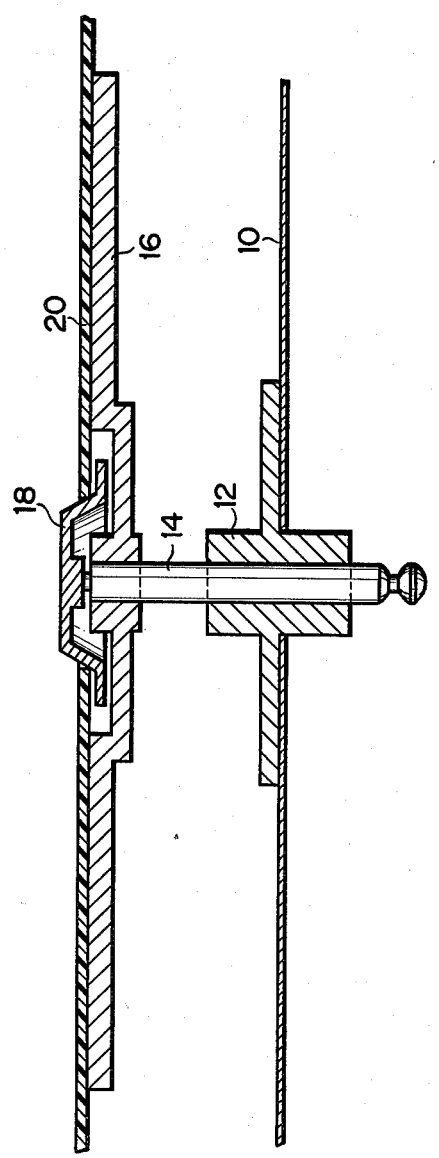
FIG. 2 is a sectional view showing the apparatus of FIG. 1 in the reproducing mode.

Now there will be described in detail a turntable apparatus 22 of one embodiment according to this invention with reference to the accompanying drawings of FIGS. 3 to 7.

A reproducing apparatus (not shown in detail) for signals recorded on a video disc provided with the turntable apparatus 22 has a horizontally extending chassis 24 therein. Formed in a predetermined position of the chassis 24 is an aperture 26, through which a bearing unit 28 extends to be attached to the chassis 24. A turntable shaft 30 is supported by the bearing unit 28 to rotate about a longitudinal axis thereof and to slide vertically.

A bore 32 having a given depth and coaxial with the turntable shaft 30 opens in the central portion of the top end surface of the turntable shaft 30. A center spindle shaft 34 is inserted in the bore 32 to slide vertically. The upper end portion of the center spindle shaft 34 projects outward from the turntable shaft 30. A compression coil spring 36 is fitted in the bore 32 between the bottom of the bore 32 and the under surface of the center spindle shaft 34. The spring 36 urges the center spindle shaft 34 to project from the turntable shaft 30, that is, in the vertical direction of FIGS. 3 and 4.

A turntable 38 is fixed on the outer peripheral surface of the upper end portion of the turntable shaft 30 to be coaxial therewith. A circular recess 40 with a given depth is formed in the central portion of the turntable 38. The top surface of the turntable 38 except for the recess 40 is defined as a mounting surface for a video disc 41 (shown in FIG. 4). On the other hand, a center spindle 42 for centering the video disc 41 is fixed on the outer peripheral surface of the upper end portion of the center spindle shaft 34 to be coaxial therewith. The center spindle 42 is substantially conical, and is fitted with a flange portion 44 around the whole circumference of the bottom portion thereof. The slope of the center spindle 42 functions as a regulating surface to regulate the position of the video disc 41. The center spindle 42 is so sized as to be able to be wholly received in the recess 40. Namely, the height of the center spindle 42 is not greater than the depth of the recess 40. Therefore, the top surface of the center spindle 42 is located flush with or below the top surface of the turntable 38 or the video disc mounting surface when the center spindle 42 is depressed against the urging force of the spring 36 to the position where the under surface of the center spindle 42 abuts against the bottom of the recess 40.

A pair of apertures 46 are formed in the bottom of the recess 40 corresponding to the periphery of the flange portion 44, facing each other with the turntable shaft 30 between them. A pin 48 is vertically passed through each of the apertures 46. The upper and lower ends of the pin 48 are located inside the recess 40 and in a space between the turntable 38 and the chassis 24, respectively. The respective pins 48 in the pair of apertures 46 are of the same length. The bottom of the pins 48 are attached to the top surface of a common ring-shaped member 50 by means of screws (not shown). The ring-shaped member 50 is coaxial with the turntable shaft 30. The bearing unit 28 is provided with an annular projected portion 52 which can abut against a felt cushion member 54 attached to the under surface of the ring-shaped member 50. The pins 48 have their respective flanges at the upper end portions thereof for preventing the pins 48 from slipping out of the apertures 46.

Figure 3:
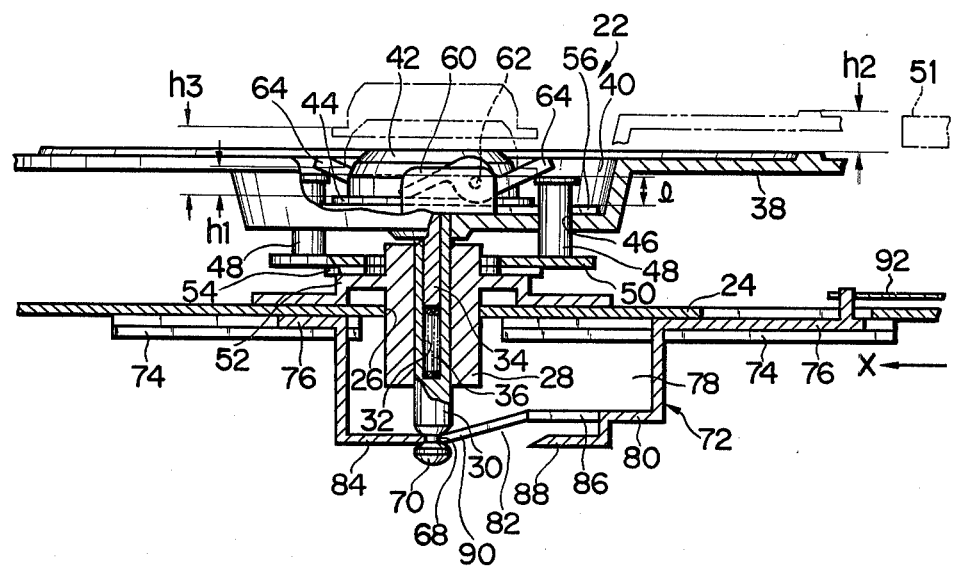
FIG. 3 is a sectional view showing a turntable apparatus of one embodiment according to this invention in the nonreproducing mode.

When the turntable 38 is in its nonreproducing position, as shown in FIG. 3, the turntable 38 is located below a casing inlet opening (not shown) through which a casing 51 containing the video disc 41 is to be inserted. In this nonreproducing mode, the ring-shaped member 50 is in contact with the projected portion 52 via the felt cushion member 54, and the top ends of the pins 48 project by a distance l above the bottom of the recess 40. On the other hand, when the turntable 38 is in its reproducing position, as shown in FIG. 4, the turntable 38 is located above the casing inlet opening, the ring-shaped member 50 is not in contact with the projected portion 52, and the top ends of the pins 48 do not project above the bottom of the recess 40.

A substantially ring-shaped mounting plate 56 is fixed on the bottom of the recess 40 by means of screws 58 so as to be substantially coaxial with the turntable shaft 30. The outer periphery of the mounting plate 56 is located radially outside the outer periphery of the flange portion 44. A pair of upright strips 60 are formed on the outer periphery of the mounting plate 56, facing each other with the turntable shaft 30 between them. The upright strips 60 are located in the vicinity of their corresponding pins 48.

A regulating member 64 is rockably mounted on each of the upright strips 60 by means of a pivot pin 62. As shown extractively in FIG. 6, the regulating member 64 has a U-shaped top surface, and is provided at the proximal portion with a through-hole 66 in which the pivot pin 62 is inserted. Further, the regulating member 64 is provided at one end with a first engaging portion 64a to engage the top surface of the flange portion 44, and at the other end with a second engaging portion 64b to engage the top end face of its corresponding pin 48. When the turntable 38 is in the nonreproducing position, as shown in FIG. 3, the regulating member 64 is rocked counterclockwise with its second engaging portion 64b pushed up by the top end face of its corresponding pin 48 which projects by the distance l above the bottom of the recess 40. Accordingly, the first engaging portion 64a of the regulating member 64 depresses the flange portion 44 of the center spindle 42 to lower the center spindle 42 against the urging force of the spring 36 to the position where the spindle 42 touches the bottom of the recess 40. That is, in the nonreproducing mode shown in FIG. 3, the center spindle 42 is wholly contained in the recess 40.

Figure 4:
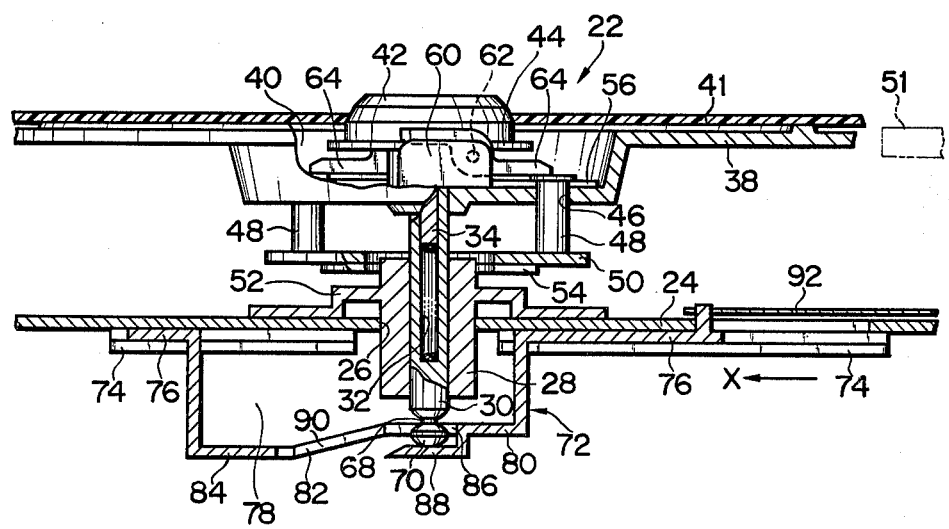
FIG. 4 is a sectional view showing the apparatus of FIG. 3 in the reproducing mode.
Figure 5:
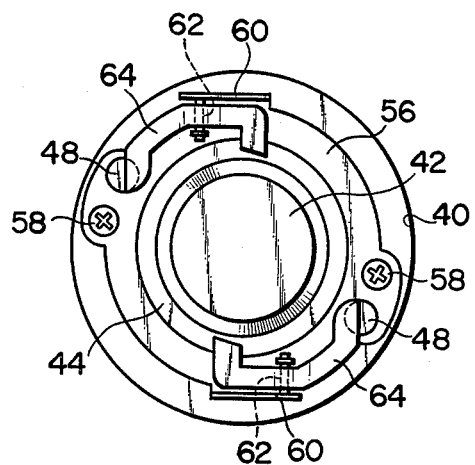
FIG. 5 is a top view showing the interior of a recess in a turntable including a center spindle shown in FIGS. 3 and 4.
Figure 6:
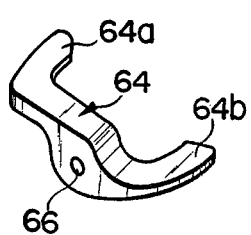
FIG. 6 is an extractive perspective view of a regulating member.
Figure 7:
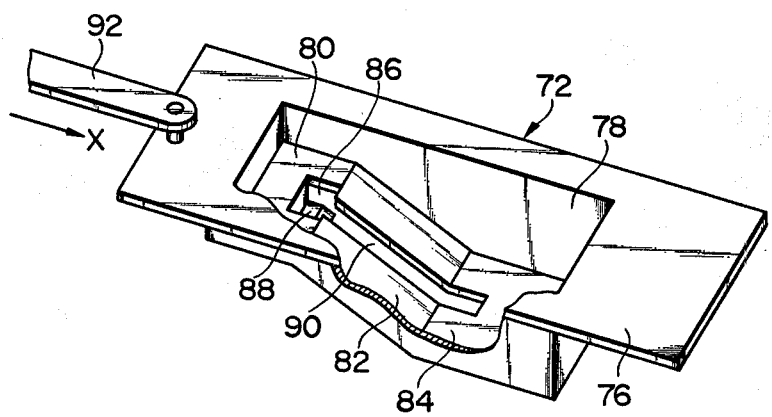
FIG. 7 is a partially broken perspective view of a slider.

On the other hand, when the turntable 38 is in the reproducing position, as shown in FIG. 4, the ring-shaped member 50 is disengaged from the projected portion 52, so that the pins 48 are free. Accordingly, the center spindle 42 is released from the external force to keep it housed in the recess 40, and hence is projected upward by the urging force of the spring 36 until the top end flanges of the pins 48 engaged with the respective second engaging portions 64b of the regulating members 64 abut against the bottom of the recess 40 via the plate 56. Here the center spindle 42 is moved up by a distance hl, which is defined both by the projected distance of the pins 48 and the ratio of the distance between the pivot pin 62 of each regulating member 64 and the point of engagement between the second engaging portion 64b and its corresponding pin 48 to the distance between the pivot pin 62 and the point of engagement between the first engaging portion 64a and the flange portion 44.

Since the turntable 38 is moved up by a distance h2 from the nonreproducing position by driving means as mentioned later, the center spindle 42 is ultimately raised through a distance h3 from the nonreproducing position. Here we have h3=h1+h2, as is evident from FIG. 3.

An annular groove 68 is formed at the lower end portion of the turntable shaft 30, and a bottom end face 70 of the turntable shaft 30 is formed of a smooth arcuated surface.

The position of the turntable 38 along the axis is defined by a slider 72 as driving means. The slider 72 is slidably supported by a pair of slider supports 74 mounted on the under surface of the chassis 24 along the direction shown by an arrow X. The slider 72, as shown in detail in FIG. 7, has a base plate 76. A recess 78 is formed substantially in the center of the base plate 76. The bottom of the recess 78 is defined by a first flat bottom plate 80 at a given depth below the level of the base plate 76, an inclined bottom plate 82 adjacent to the first flat bottom plate 80, declining in the direction shown by the arrow X, and a second flat bottom plate 84 adjoining the inclined bottom plate 82 at a depth, below the under surface of the first flat bottom plate 80, corresponding to the vertical movement of the turntable 38. These bottom plates are arranged in the order named in the direction shown by the arrow X.

A large opening 86, the width of which is larger than the diameter of the turntable shaft 30, is formed in that portion of the first flat bottom plate 80 which is adjacent to the inclined bottom plate 82. A supporting plate 88 which receives the bottom end face 70 of the turntable shaft 30 is attached to the first flat bottom plate 80 so as to be located under the opening 86. The supporting plate 88 is disposed parallel to the first flat bottom plate 80 at a space therefrom. The front end portion of the supporting plate 88 is tapered in the direction shown by the arrow X to facilitate the reception of the bottom end face 70 of the turntable shaft 30 thereby.

A slit 90 is formed along the direction shown by the arrow X in the inclined bottom plate 82 and a part of the second flat bottom plate 84 to be continuous with the opening 86. The width of the slit 90 is smaller than the diameter of the turntable shaft 30 and larger than the diameter of the annular groove 68. The turntable shaft 30 is supported on the slider 72 through engagement between the periphery of the slit 90 and the periphery of the annular groove 68 on the turntable shaft 30.

One end of a drive lever 92 is connected to the rear portion of the base plate 76 of the slider 72 on the upper stream side thereof with respect to the movement in the direction shown by the arrow X. The other end of the drive lever 92 is connected to a drive source (not shown), which drives the drive lever 92 to move in the direction shown by the arrow X in response to a reproduction instruction given by depressing the operating button of the reproducing apparatus.

Now there will be described the operation of the turntable apparatus 22 of the above-mentioned construction.

In the nonreproducing mode, the slider 72 is driven to the position shown in FIG. 3 by means of the drive lever 92, with the periphery of the annular groove 68 on the turntable shaft 30 engaged with the periphery of that portion of the slit 90 formed in the second flat bottom plate 84. Thus, the turntable 38 is located below the casing inlet opening. As for the center spindle 42, it is located inside the recess 40, and its top portion is not projected above the top surface of the turntable 38. Thus, the casing 51 containing the video disc 41 therein is allowed to be inserted right above and along the turntable 38.

The video disc 41 in the reproducing apparatus is taken out from the casing 51, and is vertically movably supported and held inside the apparatus and above the turntable 38 by a supporting member (not shown). In this state, the casing 51 is removed from the reproducing apparatus.

When the operating button of the reproducing apparatus is depressed to give the video disc 41 the reproduction instruction, the drive lever 92 gradually moves the slider 72 along the direction shown by the arrow X by means of the drive source (not shown). In response to the movement of the slider 72, the engagement between the periphery of the annular groove 68 on the turntable shaft 30 and the periphery of that portion of the slit 90 in the second flat bottom plate 84 is replaced by the engagement between the periphery of the annular groove 68 and the periphery of that portion of the slit 90 in the inclined bottom plate 82. The turntable shaft 30 is lifted along the slope of the inclined bottom plate 82. Therefore, the video disc 41 is mounted on the turntable 38 at the same time as the video disc 41 is released from the support of the supporting member. When the periphery of the annular groove 68 of the turntable shaft 30 reaches the opening 86 in the first flat bottom plate 80, the engagement is released and the bottom end face 70 of the turntable shaft 30 is supported by the supporting plate 88.

While the ring-shaped member 50 and the projected portion 52 are engaged with each other via the felt cushion member 54 between them, the pin 48 never changes its position although the turntable 38 rises. Relatively to the bottom of the rising recess 40, however, the pin 48 is lowered. Accordingly, the regulating member 64 rocks in the clockwise direction of FIGS. 3 and 4, allowing the center spindle 42 to be raised by the urging force of the spring 36 until the top end flange of the pin 48 abuts against the bottom of the recess 40. As the center spindle 42 ascends, its slope abuts against the inner peripheral surface of the center hole of the video disc 41, thereby locating the video disc 41 exactly in place on the turntable 38. The pin 48 is raised by the additional ascent of the turntable 38 after the top end flange of the pin 48 touches the bottom of the recess 40 via the plate 56, and the ring-shaped member 50 is disengaged from the projected portion 52, as shown in FIG. 4.

In this position, signals recorded on the video disc 41 may be reproduced by a reproducing stylus. The turntable 38 is rotated by the other drive mechanism (not shown). The driving force of the other drive mechanism is transmitted to the turntable 38 by means of a belt (not shown). Therefore, even if the turntable 38 vertically vibrates, the driving force will securely be transmitted to the turntable 38.

When the reproduction is completed, the other drive mechanism stops rotating the turntable 38, and the drive source for the turntable 38 moves the drive lever 92 in the direction opposite to the direction shown by the arrow X. Therefore, the slider 72 moves in the same opposite direction. The turntable shaft 30 is removed from the position where the bottom end face 70 of the turntable shaft 30 engages the supporting plate 88 of the slider 72, and is then located in the position where the periphery of the annular groove 68 on the turntable shaft 30 engages the periphery of that portion of the slit 90 formed in the inclined bottom plate 82 of the slider 72. The turntable shaft 30 descends in response to the movement of the slider 72. Therefore, the turntable 38 is moved from the position where the video disc 41 is mounted on the turntable 38 to the position where the video disc 41 is placed on the supporting member, as shown in FIG. 3. The periphery of the annular groove 68 on the turntable shaft 30 engages the periphery of that portion of the slit 90 in the second flat bottom plate 84 to stop the turntable 38 from descending and the drive source from driving the drive lever 92 stops, thus establishing the nonreproducing mode.

As the turntable 38 descends, on the other hand, the ring-shaped member 50 abuts against the projected portion 52 via the member 54 to maintain the position thereof. Accordingly, the pin 48 projects upward relatively to the bottom of the descending recess 40. Accompanying such projection, the regulating member 64 is rocked counterclockwise to depress the center spindle 42. Then, the turntable 38 is pressed down to the nonreproducing position, and thus the center spindle 42 is wholly contained in the recess 40. In other words, the top portion of the center spindle 42 ceases to project above the mounting surface of the turntable 38. Thus, the video disc 41 is released from the positional regulation by the center spindle 42, and is hence allowed to move horizontally.

In this state, the video disc 41 is supported by the supporting member, and kept above the mounting surface of the turntable 38, that is, substantially as high as the casing inlet opening of the reproducing apparatus. Then, the casing 51 is pushed into the apparatus through the casing inlet opening, and the video disc 41 is inserted into and locked in the casing 51. Thus, if the casing 51 is removed from the apparatus, then the video disc 41 will be taken out from the apparatus.

According to the one embodiment of this invention, as described in detail herein, the center spindle 42 for regulating the center position of the video disc 41 is moved relatively to the turntable 38 by means of the regulating member 64 in response to the vertical movement of the turntable 38, so that the top surface of the center spindle 42 is located flush with or below the mounting surface of the turntable 38 when the turntable 38 is lowered, and that the top portion of the center spindle 42 is projected above the top surface of the turntable 38 when the turntable 38 is raised. Accordingly, the stroke of the vertical movement of the turntable 38 may be set shorter to enable reduction of load on the motor for vertically moving the turntable 38, as well as compact design of the reproducing apparatus.

It is to be understood that this invention is not limited to the above-mentioned embodiment, and that various changes and modifications may be effected therein by one skilled in the art without departing from the scope or spirit of the invention.

In the above embodiment, the turntable is used for driving a video disc. However, the turntable may be applied also to audio discs or any other suitable discs for information filing, for example.

Moreover, the drive mechanism to move along the vertical direction of the turntable need not always be provided with the slider, and may be of any construction provided that it allows axial rotation.

Furthermore, the regulating member(s) may be one or more in number.

What is claimed is:

1. A turntable apparatus which bears and rotates a disc inserted into a reproducing apparatus for signals recorded on the disc through a disc inlet opening formed in the reproducing apparatus, comprising:
 a chassis;
 a turntable having a disc mounting surface and a recess in the central portion thereof, and rotatably supported on said chassis to move vertically between a first position where said disc mounting surface is located below said disc inlet opening and a second position where said disc mounting surface is located above said disc inlet opening to bear the disc thereon;
 a center spindle having a surface for regulating a disc mounting position, supported coaxially with an axis of rotation of said turntable, and received in said recess to move vertically between a third position where said surface for regulating the disc mounting position is located below said disc mounting surface and a fourth position where said surface for regulating the disc mounting position is located above said disc mounting surface to regulate the disc mounting position; and
 moving means for moving said center spindle from said third position to said fourth position as said turntable moves from said first position to said second position, and for moving said center spindle from said fourth position to said third position as said turntable moves from said second position to said first position, wherein said moving means includes at least one pin capable of engaging said chassis with its upper end located in said recess and its lower end penetrating the bottom of said recess to be led out downward, and at least one regulating member rockably mounted on the bottom of said recess and having one end portion engaging said center spindle and the other end portion engaging the upper end portion of said pin.

2. The turntable apparatus according to claim 1, which further comprises urging means for urging said center spindle from said third position toward said fourth position.

3. The turntable apparatus according to claim 2, wherein said urging means is a compression spring.

4. The turntable apparatus according to claim 2, wherein said pin couples to said chassis to have its upper end projected above the bottom of said recess, thereby causing said regulating member to hold said center spindle in said third position against the urging force of said urging means when said turntable is in said first position; and said pin is rendered free to cause said center spindle to be held in said fourth position by the urging force of said urging member when said turntable is in said second position.

5. The turntable apparatus according to claim 4, wherein said center spindle has a flange portion formed on the outer peripheral surface of the bottom portion thereof, said one end portion of said regulating member abutting against the upper surface of said flange portion, and said other end portion of said regulating member abutting against the upper end face of said pin.

6. The turntable apparatus according to claim 5, wherein said regulating member has a U-shaped top surface.

7. A turntable apparatus which is provided in a reproducing apparatus for signals recorded on a disc to support and rotate the disc inserted into the reproducing apparatus through a disc inlet opening formed on the reproducing apparatus, said turntable apparatus comprising,
 a chassis;
 a turntable vertically movably supported by said chassis and having a recessed portion in the center thereof;
 a shaft supported on the chassis for rotating the turntable;

a center spindle having a surface for regulating a disc mounting position and vertically movably supported in the recessed portion along the shaft; and moving means for moving the center spindle, wherein said moving means includes at least one regulating means pivotally mounted on the bottom of the recessed portion, one end of the regulating means engaged with the center spindle to vertically move the center spindle in response to pivotal movement of said regulating means.

8. The turntable apparatus according to claim 7, wherein said moving means further includes at least one vertically movable pin member extending through the bottom of the recessed portion, the upper end of said pin member being engaged with the other end of the regulating means to pivot the regulating means and to responsively vertically move the center spindle while the turntable vertically moves.

9. A turntable apparatus for rotatably supporting a disc comprising:

a chassis;

a turntable to support the disc and including means for mounting said turntable to said chassis for rotatable movement and for vertical movement between lower and upper positions relative thereto;

a center spindle coaxially disposed relative said turntable and vertically movable relative thereto between first and second positions; and moving means for moving said center spindle between said first and second positions in repsonse to said turntable respectively moving between said lower and upper positions, wherein said moving means includes reglulating means pivotally interconnected between said turntable and said center spindle, said regulating means pivotally moving in response to vertical movement of said turntable between said lower and upper positions to responsively vertically move said center spindle between said first and second positions.

* * * * *